(12) United States Patent
Prinzing

(10) Patent No.: US 6,480,206 B2
(45) Date of Patent: *Nov. 12, 2002

(54) METHOD AND APPARATUS FOR AN EXTENSIBLE EDITOR

(75) Inventor: Timothy N. Prinzing, Capitola, CA (US)

(73) Assignee: Sun Microsystems, Inc., Palo Alto, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/255,657

(22) Filed: Feb. 23, 1999

(65) Prior Publication Data

US 2002/0133519 A1 Sep. 19, 2002

Related U.S. Application Data

(60) Provisional application No. 60/075,975, filed on Feb. 24, 1998.

(51) Int. Cl.[7] .............................................. G06F 17/21
(52) U.S. Cl. ........................ 345/762; 707/100; 707/513; 707/522
(58) Field of Search ................................. 345/326, 333, 345/334, 335, 762, 765, 761, 732, 780; 707/100, 522, 513–516, 539, 527

(56) References Cited

U.S. PATENT DOCUMENTS

| 5,276,793 A | 1/1994 | Borgendale et al. ........ 707/513 |
| 5,398,312 A | 3/1995 | Hoffmann .................... 604/218 |
| 5,459,827 A * | 10/1995 | Allouche et al. ........... 707/513 |
| 5,479,596 A * | 12/1995 | Capps et al. ................. 707/539 |
| 5,530,796 A | 6/1996 | Wang .......................... 345/762 |
| 5,765,177 A | 6/1998 | Nakatsuyama et al. ..... 707/514 |
| 5,787,449 A | 7/1998 | Vulpe et al. ................. 707/513 |
| 5,860,073 A * | 1/1999 | Ferrel et al. ................. 707/522 |
| 5,862,395 A | 1/1999 | Bier .............................. 712/1 |
| 6,006,242 A | 12/1999 | Poole et al. ................. 707/531 |
| 6,016,492 A * | 1/2000 | Saxton et al. ............... 707/100 |
| 6,185,591 B1 | 2/2001 | Baker et al. ................. 707/531 |
| 6,247,032 B1 | 6/2001 | Bernardo et al. ........... 707/530 |
| 6,253,217 B1 | 6/2001 | Dourish et al. ............. 707/500 |
| 6,308,179 B1 | 10/2001 | Peterson et al. ............ 707/102 |
| 6,324,551 B1 | 11/2001 | Lamping et al. ............ 707/500 |

* cited by examiner

Primary Examiner—Raymond J. Bayerl
Assistant Examiner—Tadesse Hailu
(74) Attorney, Agent, or Firm—Finnegan, Henderson, Farabow, Garrett & Dunner, L.L.P.

(57) ABSTRACT

A modular text editor formats and displays text by creating style objects that format text elements arranged hierarchically. Style objects may include formatting information for document text elements, paragraph text elements, and character text elements. These style objects are then arranged as subclasses according to the hierarchy of text elements. Next, the text editor provides view objects to display text elements of the document. Like the style objects, the view objects are arranged as subclasses according to the hierarchy of text elements. Using information associated with the style objects, the formatted text elements in the document are displayed using the view objects.

16 Claims, 5 Drawing Sheets

METHOD AND APPARATUS FOR AN EXTENSIBLE EDITOR

RELATED APPLICATIONS

The following identified U.S. patent applications are relied upon and are incorporated by reference in their entirety in this application.

Provisional U.S. Patent Application No. 60/075,975 entitled METHOD AND APPARATUS FOR USER INTERFACE WITH PLUGGABLE LOOK AND FEEL," filed on Feb. 24, 1998 pending.

U.S. patent application Ser. No. 09/225,643, entitled "MODULAR STORAGE METHOD AND APPARATUS FOR USE WITH SOFTWARE APPLICATIONS," filed on the same date herewith.

U.S. patent application Ser. No. 09/255,654, entitled "METHOD AND APPARATUS FOR GENERATING TEXT COMPONENTS USED IN AN EDITOR," filed on the same date herewith.

U.S. patent application Ser. No. 08/885,614/P2390 filed Jun. 30, 1997, assigned to the assignee of the present invention and entitled, "METHOD AND APPARATUS FOR GENERATING A GRAPHICAL USER INTERFACE", by Timothy N. Prinzing.

BACKGROUND OF THE INVENTION

1. Field of the Invention

This invention generally relates to editors and more particularly, a method and apparatus for an extensible editor.

2. Description of the Related Art

Conventional text editors are designed as monolithic software applications containing a variety of functions. Software developers include as many features as possible in these text editor application in hopes of attracting a large number of users. Unfortunately, by adding these features many text editors have become increasingly difficult to use and complex. For example, to find a particular function or feature, a user may have to search through complex menu-driven selections or even learn complex macros to configure the text editor appropriately.

Despite their complexity, many text editors still do not meet the user's needs and may even provide many unnecessary features. Their monolithic design generally makes it difficult for users to modify the resident functions and features it provides. Even if such modifications were attempted, it would require a significant portion of the code to be rewritten which is prohibitively expensive.

SUMMARY OF THE INVENTION

A method consistent with the invention executed on computer processor for the formatting and displaying of text is provided. Initially, the method creates style objects having formatting information for text elements of a document arranged in a hierarchy. The style objects include formatting information for document text elements; paragraph text elements; and character text elements. These style objects can be hierarchically arranged as subclasses. Next, the method provides view objects to display text elements of the document. The view objects are hierarchically arranged as subclasses according to the hierarchy of text elements. Using information associated with the style objects, the text elements in the document are formatted and then displayed using the view objects.

An apparatus consistent with the present invention for formatting and displaying text is also provided. The apparatus includes, the GUI application can also add new styles to elements in the hierarchy of text elements. To accomplish this task, the GUI application subclasses a new style object capable of applying the new style to the element in the hierarchy of elements and then subclasses a new view object capable of displaying the new style to the element in the hierarchy of elements. The new style object is used to format the associated text element and the new view object then displays the information on a display device.

BRIEF DESCRIPTION OF THE DRAWINGS

The accompanying drawings, which are incorporated in and constitute a part of this specification, illustrate an implementation of the invention and, together with the description, serve to explain the advantages and principles of the invention.

In the drawings.

DETAILED DESCRIPTION

Overview

Figure 1:
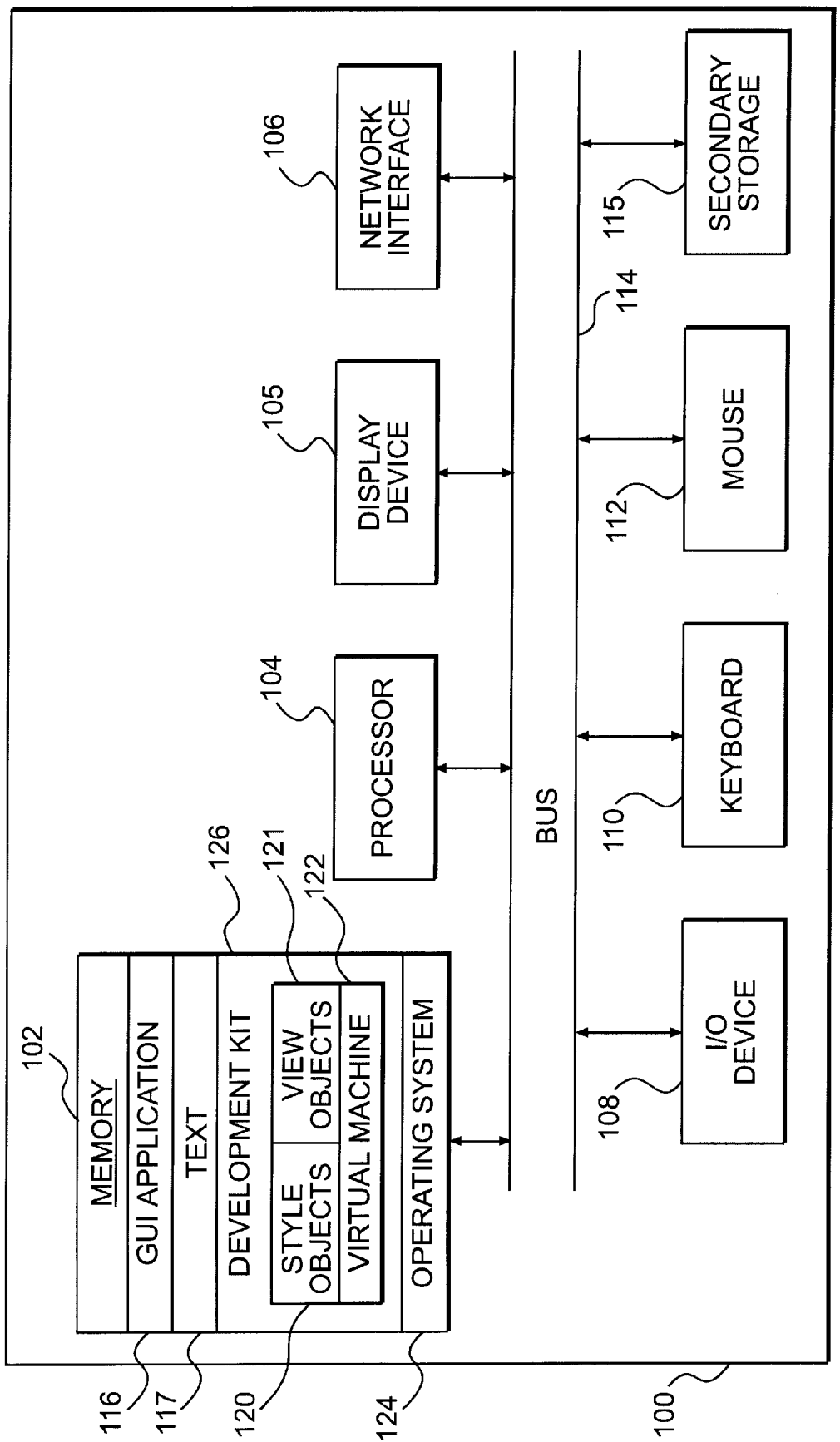
FIG. 1 is a block diagram of a computer system.

Implementations consistent with the present invention facilitate formatting and displaying text. Although, formatting and displaying text are typically performed in a text editor, they may be performed as an ancillary function in other types of applications as well. Formatting text involves applying styles to characters, paragraphs, and documents. Character level styles may include making characters bold, underlined, or italicized; paragraph styles may include line spacing, indentation, or spacing between paragraphs. Document styles may include margins, page orientation (i.e., landscape or portrait), or pagination. Displaying text involves processing the text within the document and displaying it on a display device with the proper formatting.

Designing software consistent with the present invention allows styles to be added and removed modularly by organizing the text within the document and objects that format the text hierarchically. The highest level in the hierarchy is the document element, the next level includes paragraph elements, and the lowest level includes character elements. According to the hierarchy, a document element contains paragraph elements, and each paragraph element contains character elements. Other hierarchies are possible as well, but the ones described are being used to explain a system and method consistent with the present invention.

Style objects are used to hold attributes for formatting text elements while view objects use the attribute information in the style objects to display the text elements. New styles are added by adding the formatting information to a style object and associating a new view object capable of generating a view of the new style with the corresponding text element in the hierarchy.

In particular, a document style object is associated with a document element, a paragraph style object is associated with each paragraph element, and a character style object is associated with each character element. In one implementation, each style object provides formatting information for text elements at the corresponding hierarchical level and delegates the storing of lower level formatting information to style objects at lower hiearchical levels. Alternatively, a style objects can contain all the attributes associated with a particular text element and are not required to be arranged in a hierarchy.

To display the text elements, a document view object is associated with the document element, a paragraph view object is associated with a paragraph element, and a character style object is associated with the character element. The view objects access a text elements corresponding style element to retrieve attributes and information associated with formatting the displaying the particular text element. By arranging the view objects in a hierarchy, each view object formats and displays text elements at the associated level in the hierarchy and delegates the format and display of elements at lower levels to the appropriate view object subclasses.

The technique increases modularity because style element and view elements can be added without rewriting the text editor. Instead, extending the text editor to accommodate a new style involves storing formatting information for a new style in a new style object and applying the new style to a text element with a new view object corresponding to the text element hierarchy. By associating the new view object as a subclass to existing view objects, the new view delegates formatting a text element with other styles to other view classes that are subclasses or superclasses to the new view object. The new view object formats and displays the text element with the new attribute and For example, a new character style object "WavyLine" may be associated with an existing character style object as a subclass to enable the editor to format characters with a wavy underline.

Computer System with Extensible Text Editor

FIG. 1 is block diagram of a computer system consistent with the present invention. Computer system 100 includes a memory 102, a processor 104, a display device 105, a network interface 106, an input output device 108, a keyboard 110, a mouse 112, a secondary storage 115, and a bus 114, which provides connectivity and communication among these subsystems. Network interface 106 can be connected to a Local Area Network (LAN), a Wide Area Network (WAN), or the Internet. Bus 114 may use a standard bus protocol.

Memory 102 includes a GUI application 116, text 117, a development kit (DK) 126, and an operating system 124. GUI application 116 may be a text editor, business software, a software development tool, or any other software application with a GUI capable of formatting and displaying text 117. Text 117 may be organized as a hierarchy of text elements including a document element, paragraph elements, and character elements. DK 126 provides a variety of libraries, subroutines, classes, drivers, and other software modules accessible to GUI application 116 using application programming interfaces (API).

DK 126 may also include virtual machine 122 and classes used in an object oriented programming language such as the Java™ programming language. Virtual machine 122 facilitates platform-independent data processing by simulating the operation of an abstract computing machine. Virtual machine 122 receives instructions for this abstract computing machine in the form of bytecodes. These bytecodes are interpreted and dynamically converted into a form for execution, such as object code, on processor 104. Essentially, bytecodes can be executed on any hardware platform having virtual machine 122. Java and the Java Virtual Machine and other derivatives of Java are trademarks of Sun Microsystems, Inc. and are provided as part of Sun Microsystems Java Development Kit.

Consistent with this invention, DK 126 includes style objects 120 for storing formatting information and attributes of the text elements and view objects 121 for formatting and displaying text on display device 105. View objects 121 are arranged in a hierarchy corresponding to the text element hierarchy. Each view object in view objects 121 formats and displays attributes associated with the text element at the corresponding hierarchical position. Style objects 120 can also be arranged corresponding to the text element hierarchy or can store information at a linear table of attributes associated with each text element. Adding new styles to style objects 120 and view objects 121 are discussed in further detail below.

Processing Text with Style Objects and View Objects

Figure 2:
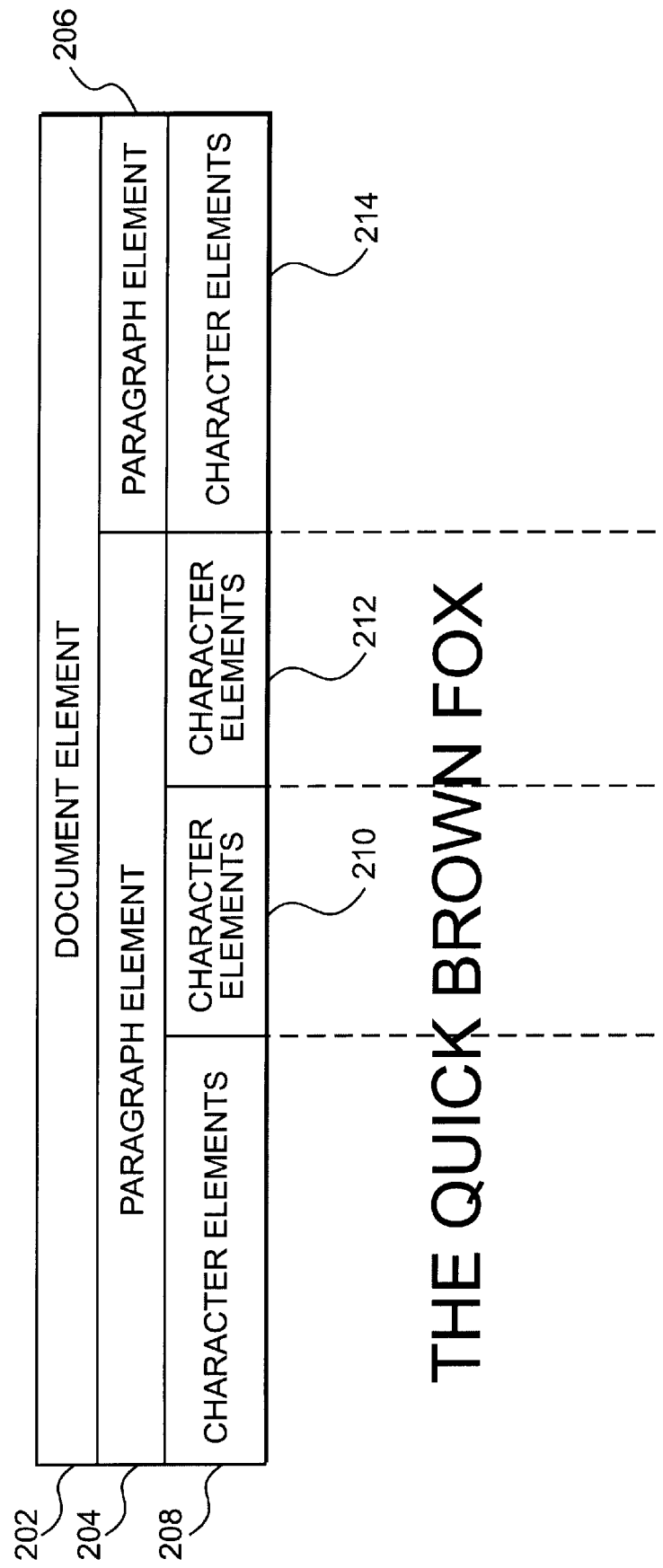
FIG. 2 is a block diagram illustrating the organization of text consistent with the present invention.

FIG. 2 is a block diagram illustrating the organization of text 117 hierarchically. Text 117 contains a document element 202, paragraph elements 204 and 206, and character elements 208, 210, 212, and 214. Document elements 202 is at the highest level. At the bottom of the hierarchy, character elements 208, 210, 212, and 214 identify sequences of text with common character level formatting. For example, if the characters associated with character elements 208 are "The quick", they would have a set of character level style attributes for these letters. Similarly, if character elements 210 were associated with "brow", and character elements 212 were associated with "n fox", these elements would each have its own character level style attributes as well. Actual formatting and display of these characters is left to style objects and view objects discussed below.

Figure 3:
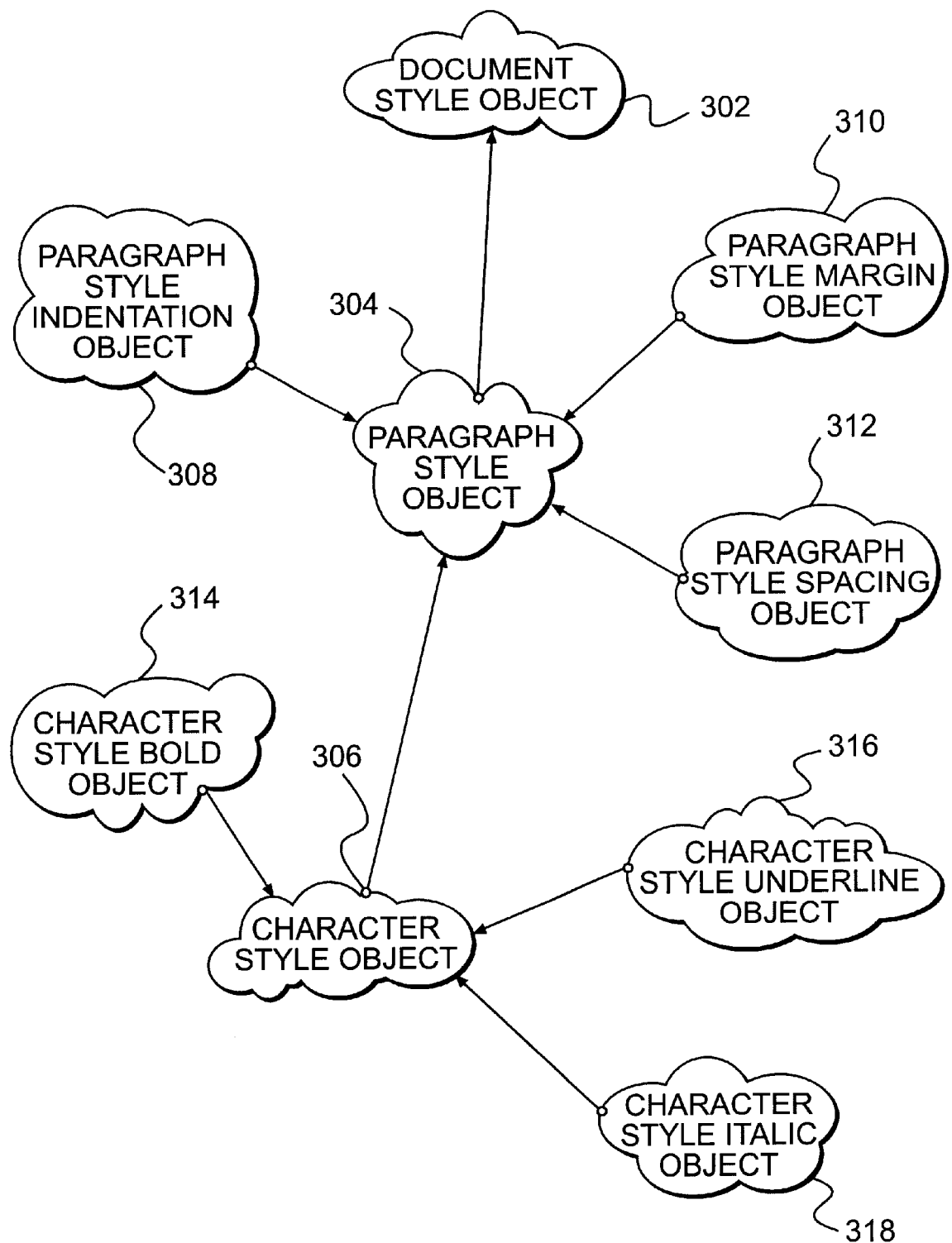
FIG. 3 is a diagram of style objects consistent with the invention used to format the text in FIG. 2.

FIG. 3 is a diagram of style objects used to format text 117. This diagram illustrates the relationships between objects used in an object oriented programming language such as Java. Style objects in FIG. 3 include a document style object 302, a paragraph style object 304, and a character style object 306. Paragraph style object 304 is subclasses to document style object 302 and character style object 302 is subclassed to paragraph style object 304. Each style object stores attributes and formatting information corresponding to different text elements. Although these style objects are arranged as a hierarchy, an alternative organization does not require the hierarchical relationship and instead associates each style object with a text element. In this latter arrangement, each style object stores a linear list of attributes and values for each text element.

In FIG. 3, paragraph style object 304 includes, a paragraph style indentation object 308, a paragraph style margin object 310, and a paragraph style spacing object 312 to control indentations, margins, and spacing between lines in a paragraph respectively. Adding another type of paragraph style merely involves adding another paragraph style object capable of holding the formatting information and attributes associated with formatting the paragraph element. Although the style objects associated with the paragraph style 304 appear as subclasses, all the formatting information and attributes associated with formatting the paragraph may also be stored as a linear list of elements in a style object such as paragraph style object 304.

Character level formatting associated with character style object 306 may be separated from paragraph style object 304. In this example, character style object 306 includes character style bold object 314, a character style underline object 316, and a character style italic object 318 that provide formatting attributes such as bold, underline, and italic for text 117. Character style objects are applied to a corresponding sequence of characters having the same formatting characteristics. For example, in FIG. 2, character elements 208 are grouped together because they have common formatting characteristics. As with paragraph styles, a new character style object can be added by adding a style object to hold attributes and formatting information for a character text element. The new style object may be arranged in the hierarchy or may simply store the information as linear list of information.

Figure 4:
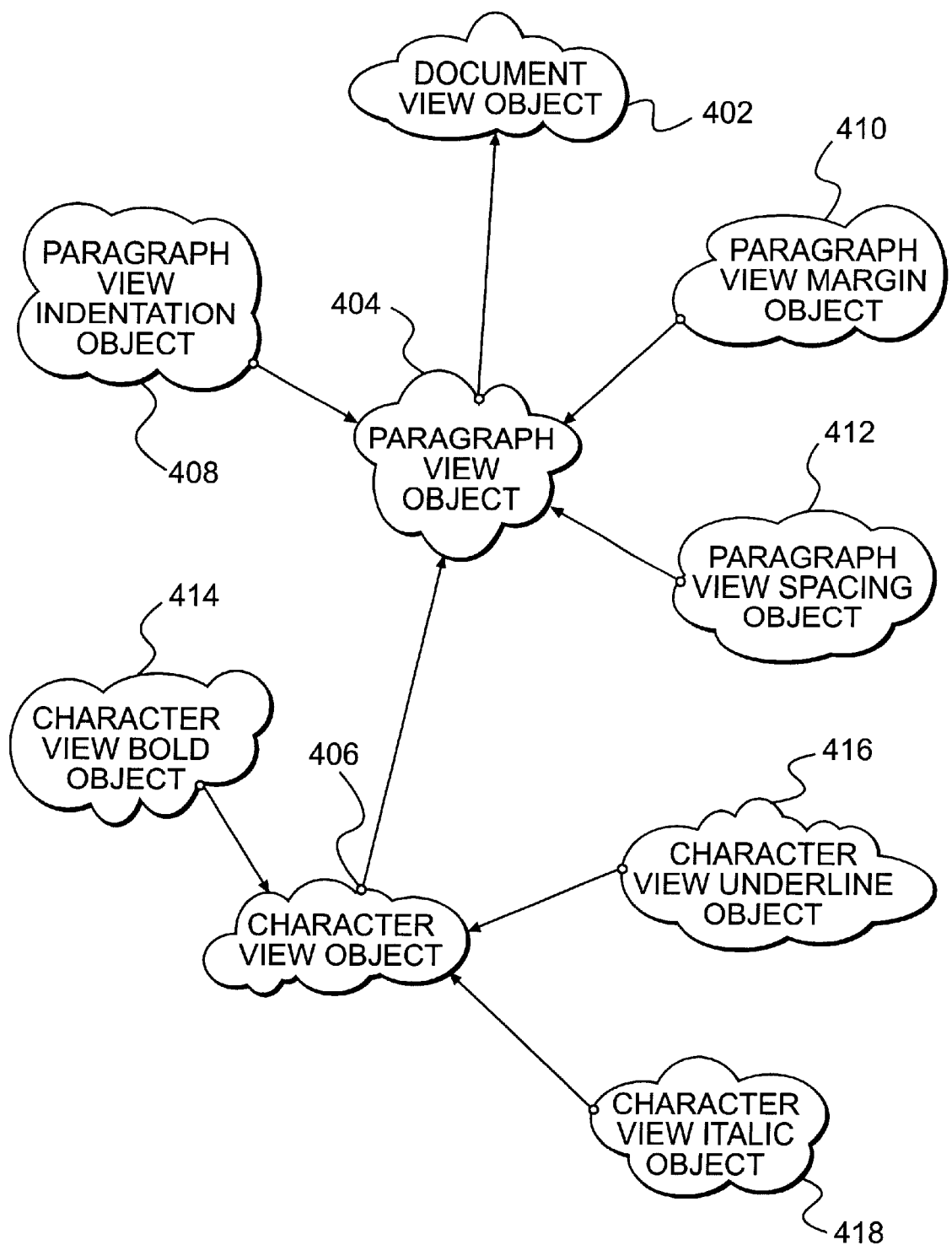
FIG. 4 is a diagram of view objects consistent with the invention used to display text in FIG. 2.

FIG. 4 is a block diagram of view objects used to format and display text 117 on a display screen. Each text element has a matching view object to format and display text properly on an output device such as a display or a printer. View objects in FIG. 4 include a document view object 402, a paragraph view object 404, and a character view object 406. Paragraph view object 404 is associated with document view object 402 as a subclass, and character view object 402 is associated with paragraph view object 404 as a subclass. Each view object processes a corresponding level of text for display and leaves the processing of lower levels of text to the subclasses.

To display a paragraph, for example, paragraph view object 404 may include a paragraph view indentation object 408, a paragraph view margin object 410, and a paragraph view spacing object 412. Specifically, these view objects are used to format and display paragraphs having indentations, margins, and spacing between lines respectively. These view objects may access the attributes and information in paragraph style object 304 or other style objects to format and display corresponding paragraph text elements. To add another type of paragraph view, another paragraph view object capable of formatting and displaying the paragraph is associated with paragraph view object 404 as a subclass.

Paragraph view object 404 delegates character level display processing to character view object 406 by defining an interface or abstract method that the lower subclasses can implement. In this example, character view object 406 includes character view bold object 414, a character view underline object 416, and a character view italic object 418. These character view objects are used to format and display text 117 having bold, underline, and italic formatting on a display device or a printer. Like the paragraph views, character views can be increased by associating a new character view with an existing character view object as a subclass.

Figure 5:
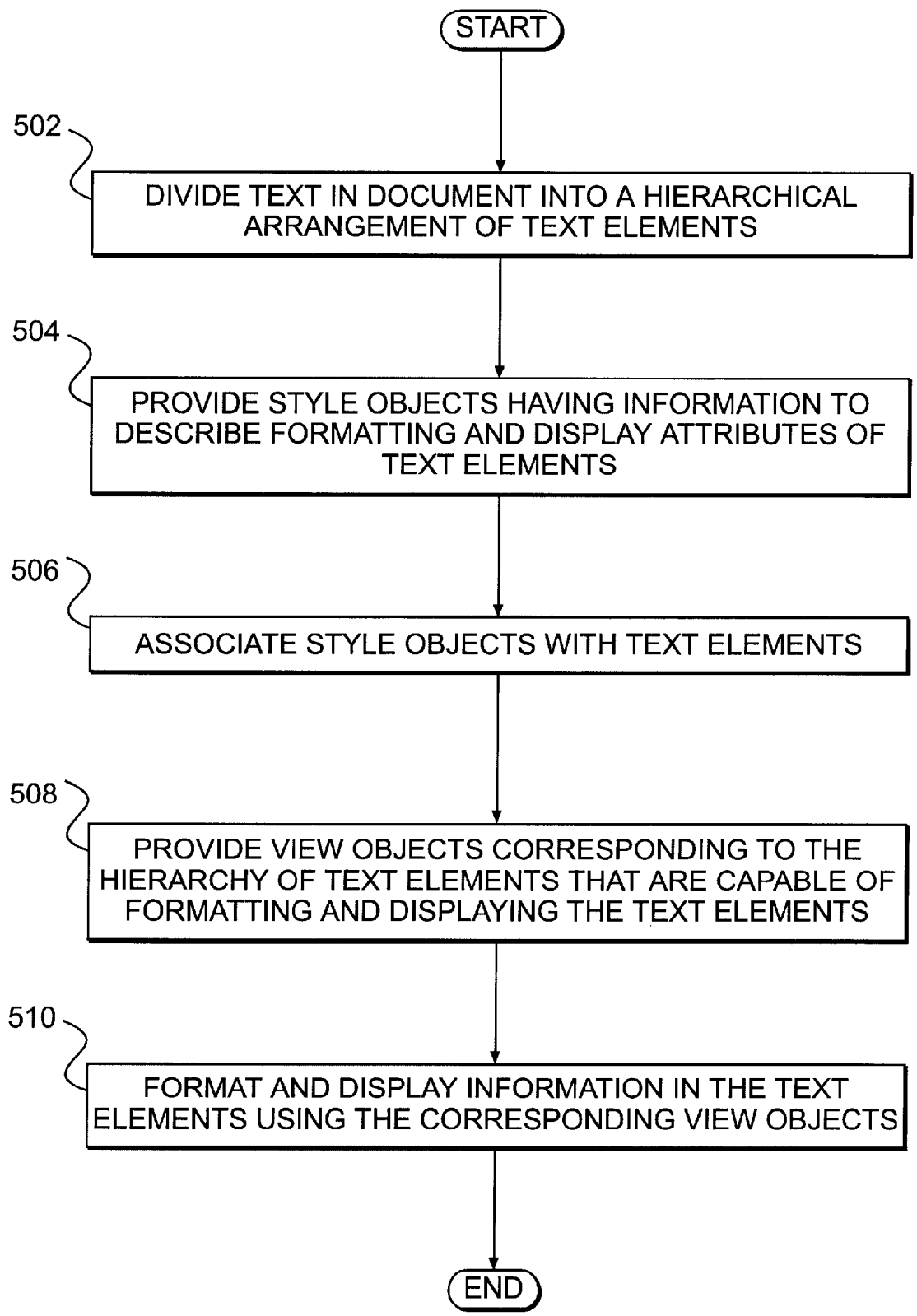
FIG. 5 is a flow chart of a method consistent with this invention to format and display text.

FIG. 5 is a flow chart of a method, consistent with the present invention, used to format and display text on a display device. Initially, the method organizes the text in the document into a hierarchical arrangement of text elements (step 502). For example, these text elements could include a document element, a paragraph element, and character elements. The paragraph elements are subsets of the document element and the character elements are subsets of the paragraph elements. The method then provides style objects having information used to describe attributes and information for formatting a text element (step 504). Each style object may include the formatting information for different levels of the text element hierarchy. Accordingly, a document style object is associated with the document element, paragraph style objects are associated with the paragraph elements, and character style objects are associated with the character elements. Next, the method associates style objects with the text elements (step 506). As previously discussed, style objects can be arranged in a hierarchy or can be arranged in a linear arrangement.

The method then provides view objects corresponding to the hierarchy of text elements (step 508). Each view object is capable of formatting and displaying different levels of the text element hierarchy. For example, a view object may access style information in a corresponding style object to format and display a corresponding text element with the style on a display. Accordingly, a document view object is associated with the document element, paragraph view objects are associated with the paragraph elements, and character view objects are associated with the character elements. Next, the method formats and displays the text elements using the corresponding view objects (step 510). Each view object is responsible for formatting and displaying only certain features of a text element. For example, one view object may be responsible for formatting a character text element bold while another view object may be responsible for formatting a paragraph with certain attributes.

While specific implementations have been described herein for purposes of illustration, various modifications may be made without departing from the spirit and scope of the invention. For example, although the hierarchy of text is divided into documents, paragraphs, and characters, other organizations of texts and corresponding style and view objects can also be used. Further, mention of displaying information on display devices can also apply to printing information on printer devices or other devices capable of providing visual information.

Those skilled in the art also understand that the present invention can be implemented in a wide variety of software platforms and is not limited to the Java programming language and development environment. Furthermore, although the examples shown involve programs stored in a computer memory, one skilled in the art will appreciate that these aspects can also be stored on or read from other types of computer-readable media, such as secondary storage devices, like hard disks, floppy disks, or CD-ROMs; a carrier wave from the Internet; or other forms of RAM or ROM. Accordingly, the invention is not limited to the above described embodiments, but instead is defined by the appended claims in light of their full scope of equivalents.

What is claimed is:

1. A method, executed on a computer processor, of formatting and displaying text, comprising:

associating style objects with corresponding text elements of a document, the style objects storing attributes and formatting information corresponding to the text elements;

associating view objects with the corresponding text elements of the document, the view objects functioning to format and display the corresponding text elements;

arranging the view objects as subclasses according to a hierarchy of the text elements;

formatting the text elements using corresponding view objects and based on attributes and information in the corresponding style objects; and displaying the text elements using the view objects and based on attributes and information in the corresponding style objects.

2. The method of claim 1, further comprising associating a paragraph view object as a subclass to a document view object and a character view object as a subclass to a paragraph view object.

3. The method of claim 1 further comprising, arranging the style objects by, associating a paragraph style object as a subclass to a document style object and associating a character style object as a subclass to a paragraph style object.

4. The method of claim 1 further comprising:

adding a new style to a text element in the document by, associating a new style object to the text element, the new style object having attributes and information for applying the new style to the text element, and associating a new view object to the text element, the new view object capable of formatting and displaying the text element with the new style.

5. The method of claim 4 wherein associating a new view object further comprises associating the new view object as a subclass in a hierarchy of view objects.

6. The method of claim 1 wherein associating style objects further comprises associating a document style object associated with a document element.

7. The method of claim 1 wherein associating style objects further comprises associating a paragraph style object associated with a paragraph element.

8. The method of claim 1 wherein associating style objects further comprises associating a character style object associated with a character element.

9. The method of claim 1 wherein associating view objects further comprises generating a document view object associated with a document element.

10. The method of claim 1 wherein associating view objects further comprises generating a paragraph view object associated with a paragraph element.

11. The method of claim 1 wherein associating view objects further comprises generating a character view object associated with a character element.

12. An apparatus configured to format and display text comprising:

a processor; and a memory having instructions executable on the processor that associates style objects with corresponding text elements of a document, the style objects storing attributes and formatting information corresponding to the text elements, associates view objects with the corresponding text elements of the document, the view objects functioning to format and display the corresponding text elements, arranges the view objects as subclasses according to a hierarchy of the text elements, and formats and displays the text elements using corresponding view objects and based on attributes and information in the corresponding style objects.

13. A memory containing program code capable of formatting and displaying text, the code having instructions for:

associating style objects with corresponding text elements of a document, the style objects storing attributes and formatting information corresponding to the text elements;

associating view objects with the corresponding text elements of the document, the view objects functioning to format and display the corresponding text elements;

arranging the view objects as subclasses according to a hierarchy of the text elements;

formatting the text elements using corresponding view objects and based on attributes and information in the corresponding style objects; and displaying the text elements using the view objects and based on attributes and information in the corresponding style objects.

14. A method, executed on a computer processor, of adding a new style to a text editor capable of formatting and displaying text, comprising:

associating style objects with corresponding text elements of a document, the style objects storing attributes and formatting information corresponding to the text elements;

associating view objects with the corresponding text elements of the document, the view objects functioning to format and display the corresponding text elements;

arranging the view objects as subclasses according to a hierarchy of the text elements;

formatting the text elements using corresponding view objects and based on attributes and information in the corresponding style objects; and displaying the text elements using the view objects and based on attributes and information in the corresponding style objects.

15. The method of claim 11, wherein the step of associating a new style further comprises:

associating a new style object capable of applying the new style as a subclass to the element in the hierarchy of elements, and associating a new view object capable of displaying the new style as a subclass to the element in the hierarchy of elements.

16. An apparatus configured to format and display text, comprising:

means for associating style objects with corresponding text elements of a document, the style objects storing attributes and formatting information corresponding to the text elements;

means for associating view objects with the corresponding text elements of the document, the view objects functioning to format and display the corresponding text elements;

means for arranging the view objects as subclasses according to a hierarchy of the text elements;

means for formatting the text elements using corresponding view objects and based on attributes and information in the corresponding style objects; and means for displaying the text elements using the view objects and based on attributes and information in the corresponding style objects.

* * * * *